US012698152B2

(12) United States Patent
Lu

(10) Patent No.: US 12,698,152 B2
(45) Date of Patent: Aug. 4, 2026

(54) DEVICES AND RELATED METHODS FOR SEPARATING AND COMPACTING TRASH

(71) Applicant: Zhongwei Lu, Amissville, VA (US)

(72) Inventor: Zhongwei Lu, Amissville, VA (US)

( * ) Notice: Subject to any disclaimer, the term of this patent is extended or adjusted under 35 U.S.C. 154(b) by 230 days.

(21) Appl. No.: 18/227,278

(22) Filed: Jul. 27, 2023

(65) Prior Publication Data

US 2024/0116700 A1 Apr. 11, 2024

Related U.S. Application Data

(60) Provisional application No. 63/393,287, filed on Jul. 29, 2022.

(51) Int. Cl.
*B65F 1/00* (2006.01)
*B65F 1/06* (2006.01)
*B65F 1/16* (2006.01)

(52) U.S. Cl.
CPC .............. *B65F 1/0046* (2013.01); *B65F 1/06* (2013.01); *B65F 1/163* (2013.01); *B65F 2210/162* (2013.01); *B65F 2210/181* (2013.01)

(58) Field of Classification Search
CPC ...... B65F 1/0033; B65F 1/004; B65F 1/0046; B65F 1/0053; B65F 1/006; B65F 1/04; B65F 1/06; B65F 1/08; B65F 1/141; B65F 1/16; B65F 1/1653
See application file for complete search history.

(56) References Cited

U.S. PATENT DOCUMENTS 4,867,328 A * 9/1989 McCarthy ............. B65F 1/0046 D34/1
5,046,635 A * 9/1991 Haas ....................... B65F 1/141 220/23.88
5,190,252 A 3/1993 Schrager
5,873,643 A * 2/1999 Burgess, Jr. ............ B65F 1/067 312/351
8,584,582 B2 * 11/2013 Johannesen, Jr. ..... B30B 9/3053 100/246
2015/0008226 A1 * 1/2015 Dotson ................... B65F 1/068 220/636

FOREIGN PATENT DOCUMENTS

CN 110712899 1/2020
CN 111056189 4/2020
CN 111056189 A * 4/2020 ................ B65F 1/16
FR 1281344 1/1962

OTHER PUBLICATIONS

Translation of CN-111056189.*

* cited by examiner

*Primary Examiner* — Bobby Yeonjin Kim
(74) *Attorney, Agent, or Firm* — Capital Patent & Trademark Law Firm, PLLC

(57) ABSTRACT

Receptacles for holding, separating, compacting and/or disposing of household trash are described.

8 Claims, 3 Drawing Sheets

START TO SPIN THE REEL

WITH LID ON TOP

START TO SPIN THE REEL

COMPACT PLASTIC WITH THE LID HANDLE

PLASTIC PACKAGING COLLECTOR (unit: inches)

TOP VIEW–LID

TOP VIEW–INSIDE COLLECTOR
original position compact position
PROFILE VIEW 1
original position compact position PROFILE VIEW 2
original position compact position

DOUBLE LEVEL GARBAGE CAN 4.5 BOY
UPPER LEVEL
LOWER LEVEL
110
104
105
102
114
109
111
101
10in
100

103
104
12in
10in
113
112
107
106
109
101
106
115
100

104
103
10in
12in
113
108
102

DEVICES AND RELATED METHODS FOR SEPARATING AND COMPACTING TRASH

RELATED APPLICATION

The present application claims priority to U.S. provisional application No. 63/393,287 filed Jul. 29, 2022 (the "'287 Application). The present application incorporates by reference the entire disclosures of the '287 Application as if it were set forth in full herein.

TECHNICAL FIELD

The present disclosure relates to devices and related methods for holding, separating, compacting and disposing of at least trash, for example.

INTRODUCTION

This section introduces aspects that may be helpful to facilitate a better understanding of the described invention (s). Accordingly, the statements in this section are to be read in this light and are not to be understood as admissions about what is, or what is not, in the prior art.

Trash is composed of a mixture of food and packaging materials, such as papers and plastics, for example. Initially, trash is placed into a temporary holding trash cans in kitchens, bathrooms and other rooms to name just a few locations. Thereafter, the temporary trash cans are emptied into larger trash cans that are then placed at or near streets or roads or placed into trash chutes in apartment complexes that empty into even larger trash dumpsters. In almost all instances, the temporary trash cans, larger trash cans, chutes and dumpsters have a maximum volume that limits the amount of trash that can received and held for eventual disposal by a trash removal truck/service at municipal waste disposal, recovery and recycling facilities.

It is therefore desirable to compact as much trash into a smaller volume to increase the amount of trash that can be disposed of at one time and to separate different types of trash for recycling purposes (e.g., separating plastic packaging into different grades for industrial processing).

SUMMARY

The present disclosure describes exemplary receptacle for holding, separating, compacting, and disposing of household trash. One such receptacle may comprise: fixed, non-movable sidewalls; a rear, fixed non-movable wall; one or more movable dividers (e.g., balls, rollers or a rail system to move the dividers from one end of the receptacle to another end); and a removable top cover configured to cover one or more internal, separate cavities (e.g., 3 or 4 cavities) for holding trash and for compacting the trash.

Such a receptacle may further comprise a removable receptacle for separating, compacting and disposing of the trash.

Further, such a receptacle may comprise one or more additional features such as: (a) fasteners to hold the receptacle stationary, where the fasteners may comprise one or more suction cups; (b) a compacting mechanism, the mechanism further comprising a handle fixed to one of the one or more movable dividers, or connected to one of the fixed, non-movable sidewalls; (c) a top supporting structure; (d) trash bag supports configured and shaped to hold and support the weight of a respective trash bag and the trash that is placed into the bag.

Another exemplary receptacle for holding, separating, compacting and disposing of household trash may comprise: an upper and lower component for collecting food and food waste, where each component comprises sidewalls and wherein the upper component comprises a removable and movable top cover configured within a first top opening, an integral bottom with an integral grating and the lower component comprises a second top opening and a fixed bottom wall, and wherein the integral grating is configured to fit within the second top opening.

In this exemplary receptacle the integral bottom may further comprise a stationary bottom or movable bottom that still further comprises one or more wheels and respective wheel locks.

Yet further, the grating may be further configured to protrude two to three inches into the second top opening of the lower component.

In embodiments, the height of the upper component may be ½ of the total height of the receptacle, or ⅔rds the total height of the receptacle.

The exemplary receptacle may further comprise one or more fasteners to hold the receptacle stationary.

Still further, a bottom of the upper component may still further comprise several openings to allow air to circulate in order to dry non-liquid trash in the upper component, while each of the lower and upper components may comprise one or more respective handles.

In additional embodiments, the exemplary receptacle may further comprise a side lever or pedal mechanism fixed outside of the lower or upper component to open the first top cover, or, in addition to opening the first top cover the side lever or pedal may disengages the lower or upper component.

In addition to receptacles, the present disclosure also provides for related methods for compacting household trash.

One such exemplary method for holding, separating and compacting household trash may comprise: holding the household trash in a receptacle that comprises one or more separate cavities; reducing the volume of one or more of the cavities that is holding the household trash by compacting the household trash with a mechanism in conjunction with one or more of dividers and sidewalls of the receptacle as the one or more dividers moves from one end of the receptacle to an opposite end of the receptacle towards a rear wall of the receptacle; and increasing the volume of another one of the one or more separate cavities as the one or more dividers moves from the one end of the receptacle to the opposite end of the receptacle.

In embodiments, the volume of each of the separate cavities may be different or may be the same.

Such an exemplary method may further comprise rotating a handle of the mechanism in a direction that causes the one or more dividers to move away from the rear wall to increase the volume of the one or more separate cavities except for one of the one or more cavities.

DETAILED DESCRIPTION, INCLUDING EXAMPLES

Figures 1A, 1B, 1C, 2:
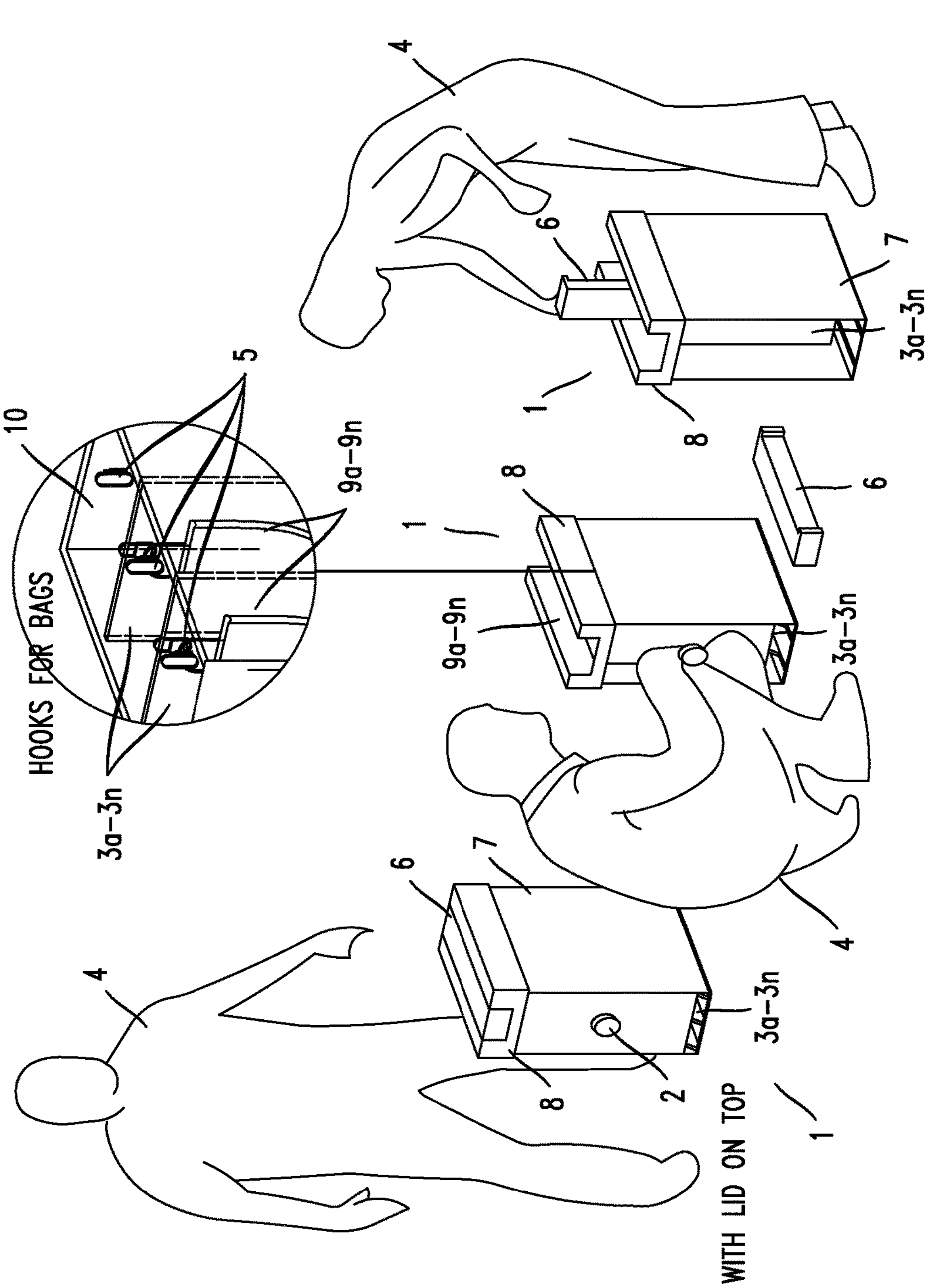
FIGS. 1A to 1C depict an exemplary device for holding, compacting and disposing household trash according to one embodiment.
FIG. 2 depicts an enlarged view of an internal separate cavity or separate cavities of the device in FIGS. 1A to 1C that include internal trash bag supports (e.g., hooks) according to embodiments of the disclosure.

Exemplary embodiments of devices and related methods for holding, separating, draining, compacting and disposing of at least trash are described herein and are shown by way of example in the drawings. Throughout the following description and drawings, like reference numbers/characters may refer to like elements.

It should be understood that, although specific embodiments are discussed herein, the scope of the disclosure is not limited to such embodiments. To the contrary, it should be understood that the embodiments discussed herein are for illustrative purposes, and that modified and alternative embodiments that otherwise fall within the scope of the disclosure are contemplated.

It should also be noted that one or more exemplary embodiments may be described as a process or method (the words "method" or "methodology" may be used interchangeably with the word "process" herein). Although a process/method may be described as sequential, it should be understood that such a process/method may be performed in parallel, concurrently or simultaneously. In addition, the order of each step within a process/method may be re-arranged. A process/method may be terminated when completed, and may also include additional steps not included in a description of the process/method if, for example, such steps are known by those skilled in the art.

As used herein, the term "and/or" includes any and all combinations of one or more of the associated listed items. As used herein, the singular forms "a," "an" and "the" are intended to include the plural form, unless the context and/or common sense indicates otherwise.

It should be understood that when a device or a component or element of device is referred to, or shown in a figure, as being "connected" to (or other tenses of connected) another device (or component or element of a device) such devices, components or elements may be directly connected, or may use intervening components or elements to aid a connection. In the latter case, if the intervening devices, components or elements are well known to those in the art they may not be described herein or shown in the accompanying figures.

To the extent the text describes, or the figures show, dimensions these are exemplary. Other dimensions may be used to provide different sized devices (e.g., trash receptacles).

As used herein, the term "exemplary" or "embodiment" mean an example that falls within the scope of the disclosure.

Referring now to FIGS. 1A to 1C there is depicted an exemplary device (e.g., a trash receptacle, bin or can, hereafter collectively "receptacle") 1 for holding, separating, compacting and disposing trash, such as household trash for example. As shown, the receptacle 1 may include fixed, non-movable sidewalls 7, and a rear, fixed non-movable wall (not shown; but see element 10 in FIG. 2). In one embodiment, the receptacle 1 may be a removable receptacle or another device 1 that is inserted into a drawer, such as in a kitchen "island". In another embodiment, the receptacle 1 may be a standalone receptacle that may include fasteners to hold the receptacle stationary (e.g., one or more suction cups on the bottom of the receptacle 1; not shown in figures).

In an embodiment, exemplary receptacle 1 may include a compacting mechanism 2 that may comprise a crank or rotatable handle (collectively "handle"). In an embodiment, the rotatable handle may be connected to metal strings or turnbuckles that are also connected to the side of the receptacle 1. The receptacle 1 may further comprise one or more movable separators or movable dividers 3*a* to 3*n* (collectively "movable dividers") to move the one or more dividers 3*a* to 3*n* from one end of the receptacle 1 to an opposite end as a user 4 rotates the handle of the mechanism 2 in one direction (e.g., clockwise or counter-clockwise).

Though the handle of mechanism 2 is depicted as being connected to fixed to one of the one or more movable dividers 3*a* to 3*n* this is merely exemplary. In an alternative embodiment the handle of the mechanism 2 may be connected to one of the fixed, non-movable and supporting sidewalls 7 of the receptacle 1 instead of a movable divider 3*a* to 3*n*.

The receptacle 1 may include a removable top cover 6 that may be configured to cover one or more separate, internal cavities 9*a* to 9*n* of the device 1 for holding trash (e.g., three or four separate cavities) formed by at least one or more sidewalls 7, a bottom wall (not shown), one or more movable dividers 3*a* to 3*n* and sometimes a rear wall 10 (see FIGS. 3B and 3C or 3F and 3G) and cover 6. In one embodiment, the receptacle 1 may initially comprise three separate cavities before compaction occurs and may include four separate cavities as compaction begins (e.g., three separate cavities holding trash and one separate cavity without trash). When the cover 6 is removed, one or more internal separate cavities 9*a* to 9*n* may be formed by, for example, one or more sidewalls 7, a bottom wall (not shown), one or more movable dividers 3*a* to 3*n* and sometimes a rear wall 10 (see FIGS. 3B and 3C or 3F and 3G).

To secure the cover 6 the receptacle 1 may include a top supporting structure 8 that may have a width larger than a cavity 9*a* to 9*n* but smaller than the width of the cover 6, and a length that is larger than all of the one or more cavities 9*a* to 9*n*, yet substantially the same as the cover 6, for example.

In addition to functioning as a cover 6, the cover 6 may also be removed and used to compact the trash within receptacle 1 by holding the cover 6 in a vertical position over trash within a cavity 9*a* to 9*n* and then downwardly forcing the cover 6 onto the top of the trash, thereby forcing the trash down towards the bottom wall (not shown) of the receptacle 1 (see, for example, FIG. 1C). The cover may measure 12 inches in length, 10 inches in width, and 24 inches in height with the opening to cavities 9*a* to 9*n* being 6" or at least half of the width of the cover (exemplary purposes; subject to change), for example.

FIG. 2 depicts an enlarged view of an internal, separate cavity or separate cavities 9*a* to 9*n*, of the receptacle in FIGS. 1A to 1C that include internal trash bag supports 5 (e.g., hooks) for each cavity 9*a* to 9*n* that may be connected to a divider 3*a* to 3*n* and/or sidewall 7 or rear wall 10. Each support 5 may be configured and shaped to hold and support the weight of a respective trash bag (not shown) and trash that is placed into the bag according to embodiments of the disclosure. After a compaction process is completed, a compacted bag and its contents (e.g., trash) may be removed from each support within a separate cavity 9*a* to 9*n* and replaced with a new, empty trash bag, for example.

Referring now to FIGS. 3A to 3G there is depicted simplified mechanical drawings of an exemplary structure of the exemplary receptacle 1 for holding, separating, compacting and disposing household trash according to one embodiment.

Figures 3A, 3B, 3C, 3D, 3E, 3F, 3G:
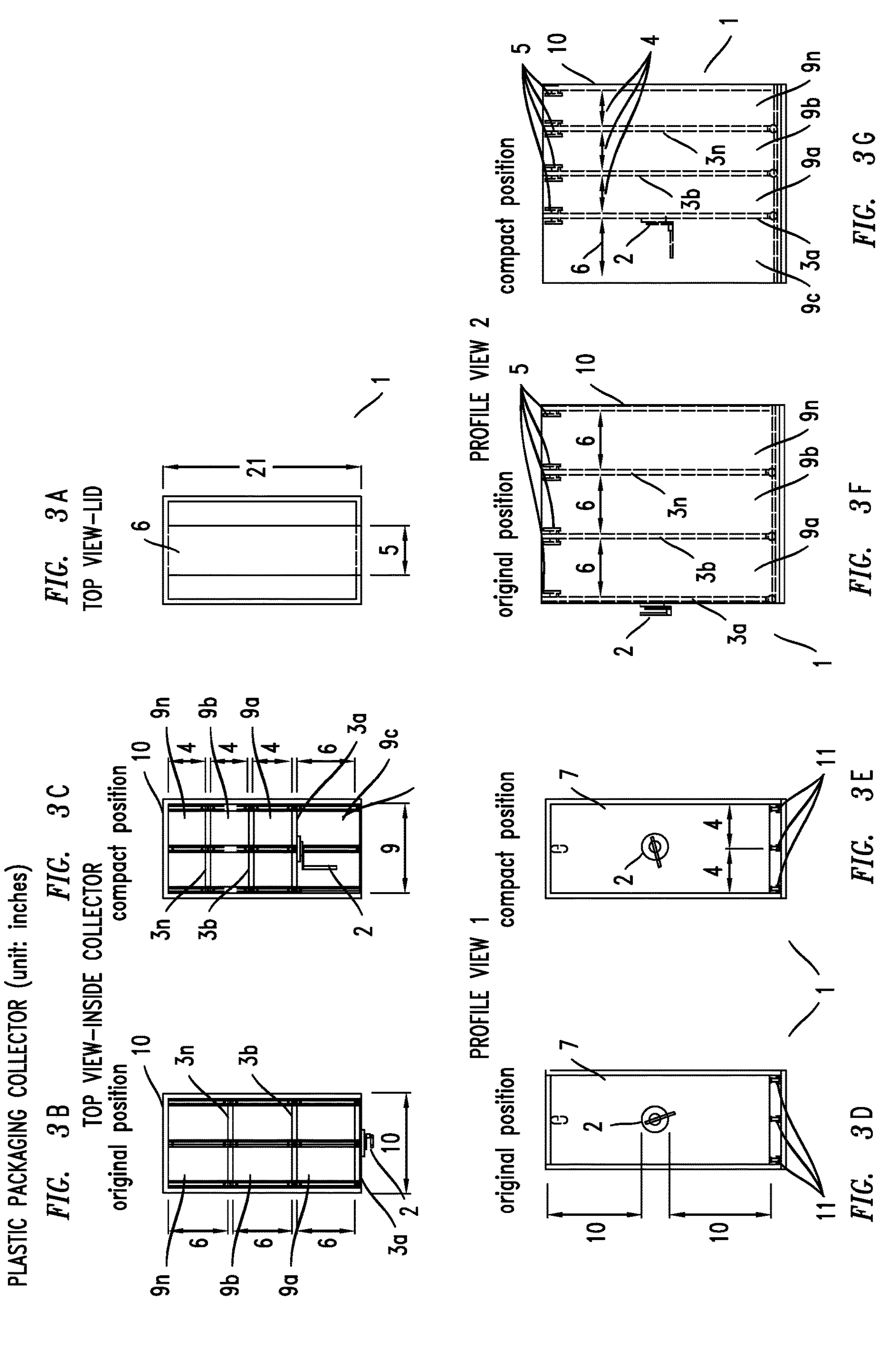
FIGS. 3A to 3G depict simplified mechanical drawings of an exemplary structure of an exemplary device for holding, separating, compacting and disposing household trash according to one embodiment.

FIG. 3D and FIG. 3E depict the bottom of the one or more movable dividers, where the dividers may comprise a small ball (e.g., ball bearings), small wheel, rollers or a rail system 11 to help move the dividers from one side of the device 1 to another side of the receptacle 1 smoothly.

Before trash is compacted, the volume of each separate cavity 9*a* to 9*n* of the receptacle 1 holding household trash may be the same (see FIGS. 3B and 3F) or may be different. Further, as trash is compacted by the elements of mechanism 2 in conjunction with one or more receptacle dividers 3*a* to 3*n*, sidewalls 7 and perhaps rear wall 10, the volume of one or more of the separate cavities 9*a* to 9*n* holding trash may be reduced as the one or more receptacle dividers 3*a* to 3*n* move from one end of the receptacle 1 to an opposite end of the receptacle 1 towards rear wall 10 of the receptacle (see for example, FIGS. 3C and 3G). Further, the volume of another one of the separate cavities 9*c* that does not hold trash-created as the one or more dividers 3*a* to 3*n* moves—may increase as the one or more receptacle dividers 3*a* to 3*n* moves from one end of the receptacle 1 to the opposite end (again, see for example, FIGS. 3C and 3G).

While all of the dividers 3*a* to 3*n* may move upon actuation of the elements of mechanism 2 during a compaction process, this is merely exemplary. In alternative embodiments only one receptacle divider 3*a* may move from one end of the receptacle 1 towards another divider 3*b* to 3*n* that is closer to an opposite end (e.g., rear wall 10) during the compaction process or, alternatively, divider 3*a* may move from one end of the receptacle 1 towards an opposite end towards the rear wall 10 during the compaction process. In any event, upon actuation of elements of the mechanism 2, the trash within the one or more separate cavities 9*a* to 9*n* may be compacted by a moving divider 3*a* to 3*n* as the divider forces the trash against a non-moving divider 3*a* to 3*n* and/or against a rear wall 10 of the receptacle 1.

Conversely, to stop the compaction process, the user 4 may rotate the handle of the mechanism 2 in a direction that causes (in an opposite direction, e.g., counter-clockwise or clockwise) the one or more movable dividers 3*a* to 3*n* to move in an opposite direction (e.g., away from the rear wall 10). As the one or more dividers 3*a* to 3*n* moves away from the rear wall 10, the volume of each separate cavity 9*a* to 9*n*, except one, may increase. The lone exception being the separate cavity 9*c* that was created as the compaction process proceeded. In an embodiment, the volume of this separate cavity 9*c* may decrease as the dividers 3*a* to 3*n* moves away from the rear wall 10.

As illustrated in FIGS. 1A to 3G the walls 7, rear wall 10 and at one divider 3*a* to 3*n* may form an external, rectangular-shaped receptacle 1, though this is merely exemplary. Other shapes, such as square or rhombus may be configured.

The exemplary receptacle 1 may have dimensions measuring twenty-four inches in height, twenty inches in length and ten inches in width to name just one of the many exemplary configurations of the receptacle 1. The cover 6 may measure 12 inches in length, 10 inches in width, and 24 inches in height with the opening being at least half as long as the width, for example.

The walls 7, 10 and dividers 3*a* to 3*n* may be composed of a wood, metal, or a rugged plastic or some combination of a wood, metal and a rugged plastic, for example.

Figures 4A, 4B, 4C:
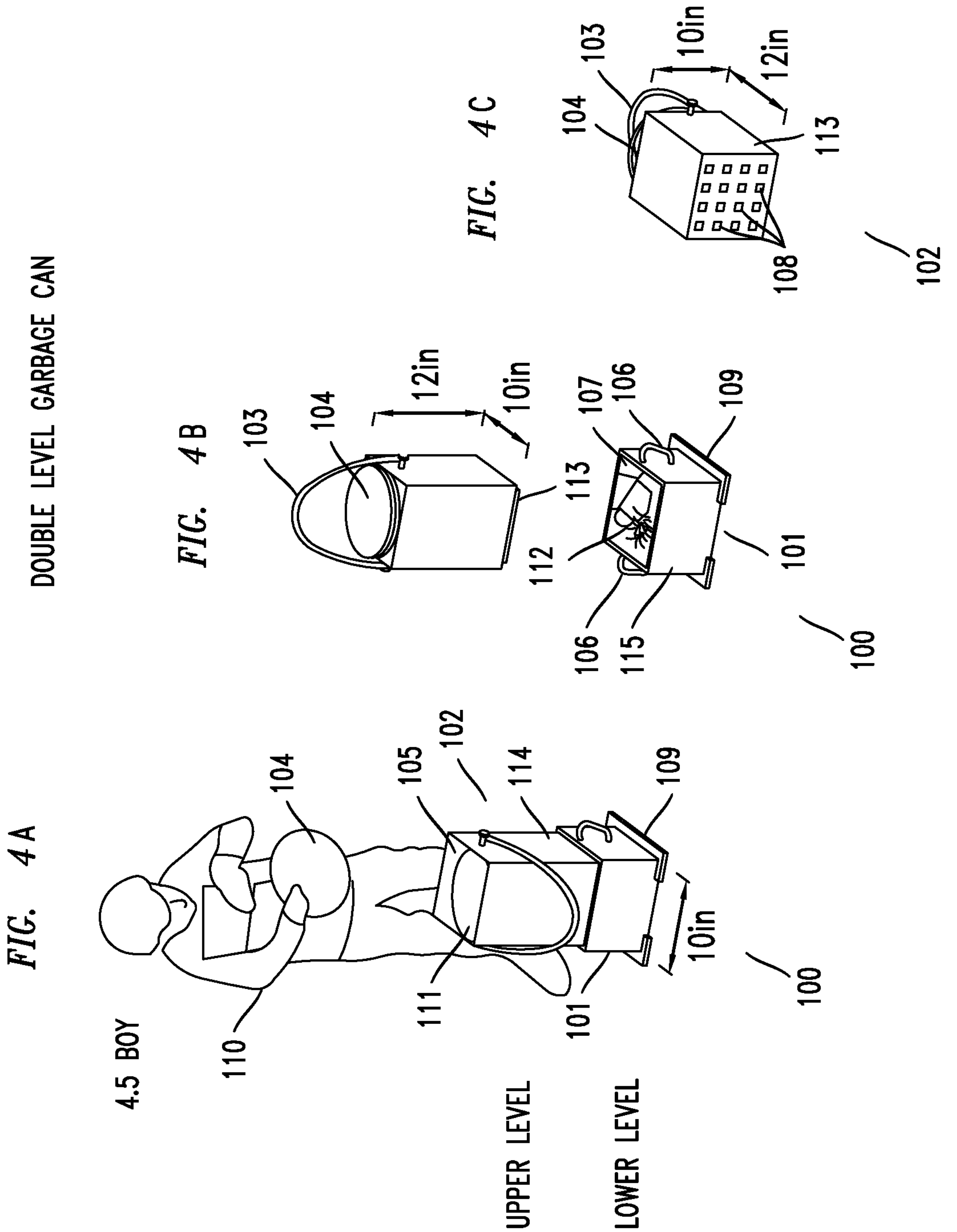
FIGS. 4A to 4C depict a second exemplary device for holding, draining, and disposing household trash according to another embodiment.

Referring now to FIGS. 4A to 4C there is depicted an exemplary device (e.g., a receptacle) 100 for holding, separating, compacting and disposing household trash. As shown, the receptacle 100 may include an upper and lower component 102, 101 where each component may comprise sidewalls. In an embodiment, the upper component 102 may include a removable and movable top cover 104 configured within a top opening 105 ("first top opening") of the component 102, and an integral bottom, fixed grating 108 while the lower component 101 may include a top opening 107 ("second top opening") and a fixed bottom wall (not shown in the figures).

In one embodiment, the dimensions of the top component's sidewalls 114 and the sidewalls of the integral grating 108 (e.g., length, width, thickness) may be the same or, alternatively, as shown in FIG. 4B, the dimensions of the sidewalls 114 may be larger than the sidewalls 113 of the grating 108. In the alternative configuration the smaller dimensioned sidewalls 113 of the grating 108 may form a shoulder-like extension of the top component 102.

In either embodiment (i.e., where the grating's sidewalls 113 have the same dimensions as the upper component's sidewalls 114 or have smaller dimensions), the integral grating 108 may be configured to fit within an opening 107 of the lower component 101. In an embodiment, the grating 108 may be further configured to protrude two to three inches into the second top opening 107 of the lower component 101, for example.

As shown in FIG. 4A, the dimensions (length, width and thickness) of the sidewalls 115 of the lower component 101 may be larger than the upper component's sidewalls 114 such that the upper component 102 securely rests on top of, or over, the lower component 101 when the integral grating 108 is inserted into the opening 107 of the lower component 101.

Alternatively, the dimensions of the sidewalls 115 of the lower component 101 may be smaller than the upper component's sidewalls 114 (not shown in figures) provided, however, such a configuration allows the upper component 102 to securely rest on top of the lower component 101 as the grating 108 is inserted into the opening 107 of the lower component 101.

Still further, the height of the upper component 102 may be ½ of the total height of the receptacle 100 (i.e., where the total height equals the combined height of both the upper and lower components when the upper component is inserted into the lower component, or the height of the upper component 102 may be ⅔rds the total height of the receptacle 100, for example.

In more detail, the exemplary upper component 102 may have sidewalls 114 whose dimensions measure twelve inches in height, for example. Further, the integral grating 108 may have sidewalls 113 that measure ten inches in width, for example. Still further, the exemplary lower component 101 may have sidewalls 115 whose dimensions measure ten inches in width, for example.

In embodiments, the entire receptacle 100 may be inserted into a drawer, such as in a kitchen "island" or laboratory cabinet. In another embodiment, the receptacle 100 may be a standalone device that may include fasteners 109 to hold the device stationary (e.g., raised moldings on the perimeter of the side walls of the lower component 101).

In an embodiment, the upper component 102 may function as a compacting mechanism. For example, when a user 110 forces the upper component 102 and its integral bottom grating 108 downwards into the lower component 101, the household trash 111 in the lower component may be compacted and liquid within the trash may be forced out of the trash. The combination of the upper component 102 and grating 108 may function as a filter to filter out, reduce or remove liquid within the trash 111 as the trash is forced onto and through the grating 108.

In an embodiment, liquid 112 forced out of the trash 111 may be captured and held within the sidewalls and bottom wall of the lower component 101. Further, a bottom of the upper component 102 may comprise several openings (not shown) to allow air to circulate in order to dry non-liquid trash in the upper component 102.

Each of the lower and upper components 101, 102 may include one or more respective handles 103, 106. Accordingly, in an embodiment, a user 110 may empty the trash 111 in the upper component and the liquid 112 (and any trash that filters through the grating 108) in the lower component 101 by lifting the respective component by its handle(s) 103, 106 and emptying it.

Optionally, or in addition to the handles 103, 106, the cover 104 may be moved to an open position by stepping on a side lever or pedal mechanism (not shown in figures) fixed outside of the lower or upper component 101, 102. The pedal mechanism may also disengage a respective lower or upper component 101, 102 so that the component 101, 102 may be lifted or removed.

As illustrated in FIGS. 4A to 4C the sidewalls of the upper component 102 and lower component 101 may form an external, rectangular-shaped device 100, though this is merely exemplary. Other shapes, such as square or rhombus may be configured.

The sidewalls 113, 114, 115, grating 108 and cover 104 may be composed of a wood, metal, or a rugged plastic or some combination of a wood, metal and a rugged plastic, for example.

I claim:

1. A removable, household receptacle configured to hold, separate, compact and dispose of household trash comprising:
- fixed, non-movable sidewalls to at least hold and separate the household trash;
- a rear, fixed non-movable wall to at least hold the household trash;
- one or more movable dividers to at least hold, separate and compact the household trash;
- a removable top cover configured to cover one or more internal, separate cavities to hold the household trash and compact the household trash, and to allow disposal of the household trash, and
- a compaction mechanism comprising at least the one or more movable dividers and a rotatable handle for moving the one or more movable dividers to compact the trash, wherein rotation of the rotatable handle is configured to move the one or more movable dividers from one end of the receptable to an opposite end.

2. The receptacle as in claim 1 further comprising a handle fixed to one of the one or more movable dividers.

3. The receptacle as in claim 1 further comprising a handle connected to one of the fixed, non-movable sidewalls.

4. The receptacle as in claim 1 wherein the one or more internal, separate cavities comprises three or four cavities.

5. The receptacle as in claim 1 further comprising a top supporting structure, having a width larger than an internal separate cavity of the one or more internal separate cavities but smaller than the width of the top cover, and a length that is larger than all of the one or more internal, separate cavities but the same as the top cover.

6. The receptacle as in claim 1 further comprising trash bag supports configured and shaped to hold and support the weight of a respective trash bag and the household trash that is placed into the bag.

7. The receptacle as in claim 1 wherein the one or more movable dividers comprise ball bearings, rollers or a rail system to move the dividers from one end of the receptacle to another end.

8. The receptacle as in claim 1 wherein the receptable comprises a receptacle that is twenty-four inches in height, twenty inches in length and ten inches in width.

* * * * *